3,228,939
6-METHYL- AND 1,6-DIMETHYL-ERGOLINE II
DERIVATIVES
Luigi Bernardi, Onofrio Goffredo, and Germano Bosisio,
Milan, Italy, assignors to Società Farmaceutici Italia,
Milan, Italy, a corporation of Italy
No Drawing. Filed Nov. 13, 1962, Ser. No. 237,344
Claims priority, application Italy, Nov. 28, 1961,
18,281/61
12 Claims. (Cl. 260—285.5)

Our invention relates to a new class of 6-methyl- and 1,6-dimethyl-ergoline II derivatives, which derivatives are per se pharmacologically active substances as well as being intermediates for the synthesis of other pharmacologically active products.

More particularly, our invention provides ergoline II derivatives having the following formula:

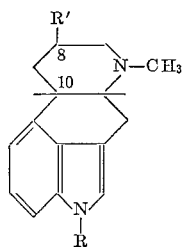

wherein
R is hydrogen or methyl,
R' is $CONH_2$ or $CH_2NHR''$, and
R'' is a hydrogen atom or an acylate radical derived from an aliphatic, cycloaliphatic, aromatic or heterocyclic carboxylic acid having from 1 to 10 carbon atoms.

The preparation of the 8-substituted 6-methyl-ergoline II derivatives having the configuration $H_{(5)}=\beta$; $H_{(10)}=\beta$; $R'_{(8)}=\beta$ is very difficult, because as is stated in Manske, "The Alkaloids VII," published by Academic Press, New York (1960), page 10, these compounds cannot be obtained by the hydrogenation of lysergic acid or its derivatives since this reaction only yields the dihydro compounds of I series ($H_{(5)}=\beta$; $H_{(10)}=\alpha$; $R'_{(8)}=\beta$). The subscript in parentheses indicates the position.

In fact, very few ergoline II derivatives are known and these have been obtained in very low yields (about 2%), no pharmacological activity having been reported.

Our invention has as an object to overcome the above-mentioned difficulties.

The process of our invention consists of the epimerization of dihydro-isolysergic acid II amide or its 1-methyl derivative with alkali, and where necessary the reduction of the resulting dihydro-lysergic acid II amide or its 1-methyl derivative with lithium aluminum hydride to the corresponding primary amine, and optionally the final acylation of the said amine to an N-acyl derivative.

The process of the invention may be illustrated by the following scheme:

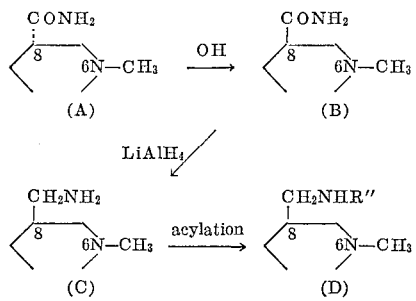

wherein R'' has the significance given above. It is understood that the remainder of the molecule remains unchanged.

The 6-methyl- and 1,6-dimethyl-8α-carboxamido-ergoline II starting materials for the process of the invention, also called dihydro-isolysergic acid II amide and 1-methyl-dihydro-isolysergic acid II amide respectively, may be in either D- or L-form or a racemic mixture. The symbol "II," which follows the names of the new ergoline derivatives of the invention, indicates that the hydrogen atom in the 10-position has the β-configuration.

In greater detail the process of the invention may be carried out as follows:

The starting 6-methyl- or 1,6-methyl-8α-carboxamido-ergoline II dissolved in a lower aliphatic alcohol having from 1 to 4 carbon atoms such as methanol, ethanol, t-butanol, anhydrous or aqueous, is reacted in the warm, preferably at the boiling temperature of the alcohol employed, with an alkaline reagent such as an alkali metal hydroxide, e.g., sodium or potassium hydroxide, or an alkali metal alcoholate, e.g., sodium or potassium methylate, ethylate or butylate, for from 10 to 25 hours, preferably from 15 to 18 hours. The epimeric 8β-carboxamido derivative, thus obtained, is isolated in known manner, preferably by cooling of the reaction mixture and filtering off the product which precipitates.

The reduction of dihydro-lysergic acid II amide (or 1-methyl-dihydro-lysergic acid II amide) is carried out by a reducing agent which is capable of reducing the amido group into an amino group, preferably lithium aluminum hydride. The reaction is carried out at room temperature, but is preferably completed in the warm, in the presence of a solvent, stable towards the reducing agent, such as an ether, such as diethyl ether, dipropyl ether, tetrahydrofuran, ethylene glycol dimethyl ether and analogues. Dihydro-lysergamine II (or 1-methyl-dihydro-lysergamine II) is isolated as such in crystalline form, preferably by concentrating the organic extract, by subsequent cooling and by final filtering in known manner.

The corresponding N-acyl derivatives are prepared by reacting dihydro-lysergamine II (or 1-methyl-dihydro-lysergamine II) with an acylating agent such as the anhydride or the chloride of an organic acid containing the radical R'' as above defined, in the optional presence of tertiary amines such as pyridine, homologues thereof and dimethylaniline.

Typical examples of acyl derivatives, prepared according to the invention, are those of the following acids: acetic, propionic, butyric, valerianic, hexanoic, heptanoic, octanoic, decanoic, cyclopentanecarboxylic, cyclopentyl-propionic, succinic, benzoic, 2,6-dimethoxy-benzoic, 3,4,5-trimethoxy-benzoic, phenyl-propionic, phenoxyacetic, α-phenoxypropionic, ethyl-carbamic and nicotinic.

The products of the invention are crystalline, colorless or yellow colored solids, stable both to light and heat, soluble in the usual organic solvents and in acids. They show a good pharmacological activity and are useful as oxytocic, antienteraminic, adrenolitic, hypotensive and sedative drugs.

The following examples are to illustrate, but not to limit, the invention.

*Example 1.—Dihydro-D-lysergamide II*

The starting material dihydro-D-isolysergamide II [melting point 211–212° C.; $[\alpha]_D^{20}=+30°$ (c.=0.3% in pyridine)] is prepared by reduction, in acetic solution and in presence of Adams platinum, of D-isolysergamide and shows physicochemical properties different from those reported by Stoll et al. (Helv. Chim. Acta., 1946, 29, 635). 10.3 g. of potassium are dissolved in 340 cc. of t-butanol. To the solution obtained, 15 g. of dihydro-D-isolysergamide II are added. The solution is concentrated to a volume of 150 cc. and is refluxed for 18 hours. Then it is evaporated to dryness in vacuo, the residue is taken up with boiling methanol and is allowed to crystallize by cooling. 11.5 g. of dihydro-D-lysergamide II are collected by filtration; melting point 318–320° C. (decomposition); $[\alpha]_D^{20}=+45°$ (c.=0.25 in pyridine-dimethylformamide 1:1).

*Example 2.—Dihydro-D-lyssergamide II*

5 g. of dihydro-D-isolysergamide II (melting point 211–212° C.) are dissolved in 150 cc. of methanol and a solution of 6 g. of sodium hydroxide in 9 cc. of water is added. The mixture is refluxed for 15 hours, cooled and the resulting dihydro-D-lysergamide II is filtered off. 1.1 g. of dihydro-D-lysergamide II are obtained, melting at 318–320° C. (decomposition); $[\alpha]_D^{20}=+45°$ (c.=0.25 in pyridine-dimethylformamide 1:1).

*Example 3.—1-dihydro-D-lysergamide II*

To a bluish solution of 1.18 g. of potassium in 650 cc. of liquid ammonia, some ferric nitrate is added and upon decolorization of the solution, 5 g. of dihydro-D-lysergamide II (melting point 318–320° C.) are added. The solution, cooled by a carbon dioxide-acetone refrigerating mixture, is kept under stirring for 8 hours. 4.35 g. of methyl iodide are then poured in and after an hour, the refrigerating bath is removed so as to cause the slow evaporation of ammonia. The dry residue is taken up with a small amount of methanol and made alkaline with 36 Bé. sodium hydroxide. It is extracted with chloroform, the extracts are washed with water to neutrality and evaporated to dryness in vacuo. The residue is taken up with warm methanol and decolorized with charcoal. On cooling, 1-methyl-dihydro-D-lysergamide II separates; it melts at 261–263° C., $[\alpha]_D^{20}=+49°$ (c.=0.3 in pyridine); yield: 3.8 g.

*Example 4.—Dihydro-D-lysergamide II*

2 g. of dihydro-D-lysergamide II (melting at 318–320° C.) are suspended in 200 cc. of anhydrous tetrahydrofuran, whereupon 2 g. of lithium aluminum hydride are added. The mixture is kept for 1 hour at room temperature, it is refluxed for an hour and a half after which time two thirds of the solvent are distilled off. The solution is cooled with ice, the excess reagent is decomposed slowly by adding water, and the reaction mixture is thoroughly extracted with chloroform. The chloroform extract is washed three times with water and the solvent evaporated in vacuo. The residue is taken up with warm ethyl ether and crystallized. 1.3 g. of amine are obtained, melting at 210–212° C.; $[\alpha]_D^{20}=+40°$ (c.=0.25 in pyridine).

*Example 5.—1-methyl-dihydro-D-lysergamine II*

To a suspension of 1.3 g. of lithium aluminum hydride in 80 cc. of anhydrous tetrahydrofuran, a solution of 0.750 g. of 1-methyl-dihydro-D-lysergamide II [melting point 261–263° C. $[\alpha]_D^{20}=+49°$ (c.=0.36 in pyridine)] in 140 cc. of anhydrous tetrahydrofuran is added at an internal temperature of 40° C. The mixture is kept under stirring for 90 minutes at an internal temperature of 55–60° C., is refluxed for 60 minutes, cooled with a refrigerating bath, and the excess of lithium aluminum hydride is cautiosly decomposed with a small amount of water, under a vigorous stirring of the mixture for 30 minutes. The resulting mixture is thoroughly extracted with chloroform. The chloroform extracts combined are washed with water and evaporated to dryness in vacuo. The solid residue is taken up with a small amount of warm ether, filtered and dried to yield 0.480 g. of 1-methyl-dihydro-D-lysergamine II, melting at 154–156° C.; $[\alpha]_D^{20}=+40°$ (c.=0.5 in pyridine).

*Example 6.—N-acetyl-dihydro-D-lysergamine II*

0.300 g. of dihydro-D-lysergamine II in 2 cc. of pyridine are cooled to −10° C. and 0.200 cc. of acetyl chloride are added thereto. The mixture is kept at this temperature for 10 minutes and afterwards at room temperature for 10 minutes. After diluting with chloroform, the mixture is washed with aqueous sodium hydroxide solution and three times with water. After distilling off the solvent in vacuo, the residue is dissolved in acetone, decolorized with charcoal and concentrated to small volume. After adding petroleum ether, 0.200 g. of N-acetyl-dihydro-D-lysergamine II, melting at 225–227° C. crystallizes.

*Example 7.—N-α-phenoxy-propionyl-dihydro-D-lysergamine II*

The preparation is carried out in the same way as in Example 6, from 0.300 g. of dihydro-D-lysergamine II in 2 cc. of pyridine and 0.3 cc. of α-phenoxy-propionyl chloride and, by recrystallization from acetone-petroleum ether, 0.250 g. of N-α-phenoxy-propionyl-dihydro-D-lysergamine II, melting at 165–167° C., are obtained.

*Example 8.—N-carbethoxy-dihydro-D-lysergamine II*

The preparation is carried out in the same way as in Example 6, using 0.300 g. of dihydro-D-lysergamine II and 0.300 cc. of ethyl chlorocarbonate in 2 cc. of pyridine and, by recrystallization from acetone-petroleum ether, 0.300 g. of N-(carbethoxy)-dihydro-D-lysergamine II, melting at 205–207° C., are obtained.

*Example 9.—N-benzoyl-dihydro-D-lysergamine II*

The preparation is carried out in the same way as in Example 6, from 0.300 g. of dihydro-D-lysergamine II and 0.300 cc. of benzoylchloride in 2 cc. of pyridine and, by recrystallization from acetone-petroleum ether, 0.200 g. of N-benzoyl-dihydro-D-lysergamine II, melting at 118–120° C., are obtained.

*Example 10.—N-propionyl-dihydro-D-lysergamine II*

The preparation is carried out in the same way as in Example 6, from 0.300 g. of dihydro-D-lysergamine II and 0.300 cc. of propionyl chloride in 2 cc. of pyridine and, by recrystallization from acetone-petroleum ether, 0.250 g. of N-propionyl-dihydro-D-lysergamine II, melting at 208–210° C., are obtained.

*Example 11.—N-(2′,6′-dimethoxy-benzoyl)-dihydro-D-lysergamine II*

The preparation is carried out in the same way as in Example 6, from 0.400 g. of dihydro-D-lysergamine II and 0.400 cc. of 2,6-dimethoxy-benzoyl-chloride in 3 cc. of pyridine and, by recrystallization from acetone, 0.450 g. of N-(2′,6′-dimethoxy-benzoyl)-dihydro-D-lysergamine II, melting at 238–240° C., are obtained.

*Example 12.—N-cinnamoyl-dihydro-D-lysergamine II*

The preparation is carried out in the same way as in Example 6, from 0.400 g. of dihydro-D-lysergamine II and 0.4 cc. of cinnamoyl chloride in 3 cc. of pyridine and, by recrystallization from acetone-petroleum ether, 0.300 g. of N-cinnamoyl-dihydro-D-lysergamine II, melting at 248–250° C., are obtained.

*Example 13.—N-nicotinoyl-dihydro-D-lysergamine II*

The preparation is carried out in the same way as in Example 6, from 0.400 g. of dihydro-D-lysergamine II and 0.500 g. of nicotinoyl chloride hydrochloride in 3 cc. of pyridine and, by recrystallization from acetone-petroleum ether, 0.400 g. of N-nicotinoyl-dihydro-D-lysergamine II, melting at 123–125° C., are obtained.

*Example 14.—1-methyl-N-acetyl-dihydro-D-lysergamine II*

The preparation is carried out in the same way as in Example 6, from 0.300 g. of 1-methyl-dihydro-D-lysergamine II prepared as described in Example 5 [melting point 154–156° C.; $[\alpha]_D^{20}=+40°$ (c.=0.5 in pyridine)] and 0.300 g. of acetyl chloride in 2 cc. of pyridine and, by recrystallization from acetone-petroleum ether, 0.250 g. of 1-methyl-N-acetyl-dihydro-D-lysergamine II, melting at 210–212° C., are obtained.

We claim:
1. 1-methyl-dihydro-D-lysergamine II.
2. N-acetyl-dihydro-D-lysergamine II.
3. N-propionyl-dihydro-D-lysergamine II.
4. N-carbethoxy-dihydro-D-lysergamine II.
5. N-benzoyl-dihydro-D-lysergamine II.
6. N-(α-phenoxy-propionyl)-dihydro-D-lysergamine II.
7. N - (2',6' - dimethoxy - benzoyl) - dihydro-D-lysergamine II.
8. N-cinnamoyl-dihydro-D-lysergamine II.
9. N-nicotinoyl-dihydro-D-lysergamine II.
10. 1-methyl-N-acetyl-dihydro-D-lysergamine II.
11. A D-ergoline II compound of the formula:

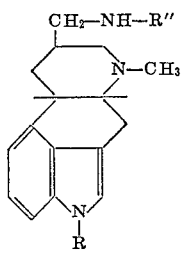

wherein R is selected from the group consisting of hydrogen and methyl; and R'' is an acyl group of an acid selected from the group consisting of
  (a) substituted and unsubstituted aliphatic acids of from 1 to 4 carbon atoms, wherein the substituent is phenoxy;
  (b) cinnamic acid;
  (c) substituted and unsubstituted benzoic acid, wherein the substituent is methoxy; and
  (d) nicotinic acid.

12. A process for preparing a compound of the formula:

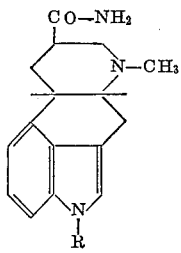

wherein R is selected from the group consisting of hydrogen and methyl,
which comprises
  (a) epimerizing a compound selected from the group consisting of dihydro-isolysergamide II and 1-methyl-dihydro-isolysergamide II; dissolved in a lower aliphatic alcohol having from 1 to 4 carbon atoms at the boiling temperature of the alcohol employed; with a compound selected from the group consisting of alkali alcoholate and alkali hydroxide, for a period of time from 10 to 25 hours, and
  (b) recovering the corresponding 8β-carboxamido derivative thus obtained.

References Cited by the Examiner
UNITED STATES PATENTS
2,265,207  12/1949  Stoll et al. _____ 260—285.5
3,155,667  11/1964  Camerino _____ 260—285.5

FOREIGN PATENTS
674,061    6/1952  Great Britain.
769,260    3/1957  Great Britain.
811,964    4/1959  Great Britain.
1,092,923  5/1957  Germany.

OTHER REFERENCES
Manske: The Alkaloids, vol. VII, pp. 9–15 (1960).
Stoll et al.: Helv. Chim. Acta, vol. 36, pp. 1512–1526 (1953).

NICHOLAS S. RIZZO, *Primary Examiner.*

WALTER A. MODANCE, *Examiner.*